Patented Apr. 2, 1946

2,397,799

UNITED STATES PATENT OFFICE 2,397,799

AMINO-ETHERS AND A PROCESS FOR THEIR MANUFACTURE

Henry Martin, Franz Häfliger, Karl Gätzi, and Adolf Grob, Basel, Switzerland, assignors to J. R. Geigy A. G., Basel, Switzerland, a Swiss firm No Drawing. Application August 23, 1943, Serial No. 499,708. In Switzerland September 23, 1942

9 Claims. (Cl. 260—570.7)

The spasmolytic effect of the benzyl alcohol and its esters, for instance of the benzyl acetate and benzyl benzoate, is known (Macht, J. Pharmacol. exp. Therapeutics 9, 197 (1917)). In view of the supposition that the capability of easy saponification of the esters would provoke a strong spasmolyse, benzyl esters of high fatty acids have been synthesized which may more easily be split by lipase than the benzyl ester of aromatic acids (H. Shonle and P. Q. Row, J. Amer. Chem. Soc. 43, 361 (1921)). Mortimer Bye (Ind. Engng. Chem. 13, 217 (1921)) recommends the benzyl succinate because of its non-poisonousness. C. Nielsen and J. Higgins (J. Lab. Clin. Med. 7, 579 (1922)) also are of the opinion that the "benzyl effect" of the esters results from the hydrolytic production of benzyl alcohol. On intravenous injection of benzyl benzoate and cinnamic acid benzyl ester, they have stated a stronger efficiency of the latter.

On the other hand, E. Snapper, Grünbaum and Sturkop (Biochem. Z. 155, 163 (1925)) are of the contrary opinion. They are of the opinion that the efficiency results from the unsplit molecule and recommend the use of the difficultly splittable N-benzyl phthalamide acid (Klin. Wschr. 4, I, 389, 1925) which is obtainable in the trade in form of suitable salts. An analogous compound is the N-benzylmalonamidic acid.

Moreover, the following compounds have been proposed: the cholic acid benzyl ester, the benzyl esters of high molecular fatty acids (J. Amer. Chem. Soc. 43, 361 (1921)) and the citric acid benzyl ester.

All these compounds are characterized by a spasmolytic musculotropic efficiency of the papaverine; a neurotropic, atropine-like efficacy is missed. The same is the case for comparable benzyl ether compounds, among which for example the acetobromopyrocatechine benzyl ether has become known.

Opposite thereto it has now been found that aminoalkyl ethers of alcohols of the aromatic aliphatic series of the general formula

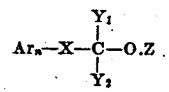

wherein Ar means an aromatic radical, $n$ means one or two, X represents the direct bond or an organic radical which may also contain hetero atoms, $Y_1$ means hydrogen or like $Y_2$ a hydrocarbon radical and Z represents an N-disubstituted aminoalkyl radical, possess a manifest atropine-like efficiency. Like atropine the new compounds show a considerable antispasmodic efficacy, especially for the smooth muscular system of the intestines. When using the new compounds, the mostly undesirable by-effects of the atropine are diminished or also completely missed. Such an efficacy could not have been foreseen, as up to today such a neurotropic-like efficiency has become known only for basic substituted esters and amides of hydroxy acids, such as for example of the tropic acid, amygdalic acid, atroglycerinic acid, benzilic acid, o- and m-hydroxybenzoic acid or corresponding derivatives of the benzoic acid, phenyl acetic acid and hydrogenation products thereof.

Beside the atropine-like effect the new aminoalkylethers develop also a manifest papaverine-like efficiency and show still strong anesthetic and partly also manifest bactericidal properties. The corresponding quaternary compounds and oxides have a similar behaviour.

The aminoalkyl ether according to the above definition may be prepared according to various methods. Thus, for example, reactive esters of α-substituted benzyl alcohols, e. g. the halides, can be interacted with disubstituted amino alcohols in the presence of agents binding hydrogen halide, but it is also possible to cause metal compounds of α-substituted benzyl alcohols to react with basic substituted reactive alkyl esters. Among these latter compounds may be understood the esters of amino alcohols disubstituted at the nitrogen, especially the esters with hydrogen halide acids; however, esters of aryl sulfonic acids and the like may be used quite well. For the reaction with metal salts of α-substituted benzyl alcohols the alkali salts of the alcohol come especially into consideration. A further possibility of production consists in that correspondingly esterified α-substituted aralkyl ethers, e. g. α-substituted benzyl halogenoalkyl ethers, are interacted with secondary or tertiary amines. In order to produce halogenoalkyl ethers it is advantageous to cause α-substituted aralkyl alcohols or salts thereof to react with alkylene halogen hydrines or alkylene dihalides in presence or absence of diluents and to replace the hydroxyl groups possibly present in the resulting compounds by halogen.

As α-substituted aralkyl alcohols are to be understood secondary and tertiary alcohols such as for instance they may formally be obtained by substitution of the CH₂-group of the benzyl alcohol. The substituents may for example be of aliphatic, araliphatic, hydroaromatic or aromatic nature. Secondary α-substituted benzyl alcohols can for instance be produced by catalytic reduction of the corresponding aryl alkyl ketones, while secondary alcohols may also be recovered according to Grignard by interaction of suitable halides with aldehydes. By the analogous interaction with aliphatic, araliphatic or cycloaliphatic ketones there result tertiary substituted aralkyl alcohols. The aromatic radicals can also be bound to the aliphatic radical containing hydroxy groups by intercalating linking hetero atoms such as e. g. oxygen, nitrogen and the like instead of carbon alone. Moreover, the aromatic nuclei may often preferably be substituted in the nucleus, for instance by halogen atoms or by alkoxy groups or they may contain several aromatic nuclei which may be condensed with each other.

By addition of alkyl halides, alkylene halides, aryl sulfonic acid esters, dialkyl sulfates, aralkyl halides and so on or by interaction with suitable agents which develop oxygen, there are obtained in the usual manner quaternary ammonium compounds or oxides from the N-disubstituted amino alkyl ethers.

The new compounds may be used as therapeutics.

In order to fully understand the present invention, the same may now be illustrated by the following examples without being limited thereto, the parts being by weight, unless otherwise stated.

Example 1

Into a suspension of 20 parts of powdered sodium amide in 300 parts of absolute benzene are dropwise introduced 75 parts of n-propylphenyl-carbinol and the whole is stirred for 1 hour at 60° C. Then 70 parts of β-chloro-ethyl diethylamine are added thereto and the mixture is heated for 6 hours under reflux and while stirring. After cooling the whole is treated with water and then shaken out several times with 10% hydrochloric acid. The combined hydrochloric acid extracts are made alkaline by means of potassium carbonate, then the base thus separated is taken up in ether, the ethereal solution washed with a concentrated potassium carbonate solution, dried with solid potassium carbonate and finally the ether is evaporated. The residue boils at a pressure of 12 mm. at 139°–143° C. The yield amounts to 88 parts.

The same compound can also be prepared in the following manner: 2 parts of sodium are dissolved in a solution of 11 parts of diethylamino-ethanol in 40 parts of benzene. After cooling the calculated quantity of α-n-propylbenzyl chloride is added by portions whereby the temperature is maintained below the boiling point by incidentally cooling. When the reaction begins to decrease, the mixture is heated under reflux on the water-bath for still one hour, then it is cooled, shaken with water and finally, while cooling, stirred with diluted hydrochloric acid. After a repeated washing of the benzene with water, the combined extracts are precipitated by means of potassium carbonate and the separated base is extracted with benzene. After having removed the solvent, the base distills at a pressure of 12 mm. at 140°–141° C.

If, instead of n-propylphenyl-carbinol, other alkyl phenyl carbinols are used in the above example, the following final products are obtained having the boiling points mentioned in the following.

| Alkyl of the alkyl-phenyl-carbinol | Boiling point | at mm. pressure |
|---|---|---|
| | °C. | |
| CH₃ | 134–136 | 14 |
| CH₃.CH₂ | 135–139 | 12 |
| CH(CH₃)₂ | 132–135 | 12 |
| CH₃.CH₂.CH(CH₃)₂ | 152–156 | 12 |
| CH₃.CH=CH₂ | 135–139 | 12 |

Example 2

The calculated quantity of powdered sodium is added to a solution of ⅕ molecule of ethylene chlorhydrine in 100 parts of benzene and, after completion of the reaction, treated with ⅕ molecule of α-isobutylbenzyl chloride (prepared from isobutyl phenyl carbinol and thionyl chloride). When the reaction has completed, the whole is shaken with ether and water, the benzene-ether-solution dried, the solvent evaporated and the residue fractionated in vacuo. The α-iso-butyl-benzyl-(chloroethyl)-ether boils at 122°–125° C. at a pressure of 15 mm. 27 parts of this compound are then treated in the warmth with an excess of diethyl amine and, after completion of the reaction, washed with a mixture of ether and water. The ethereal extract is dried and freed from the solvent. Thus, the α-isobutyl-benzyl-(diethylaminoethyl)-ether is obtained. Melting point 143°–149° C. at 12 mm. pressure.

Instead of ethylene chlorhydrine also other ethylene halogenhydrines, such as for instance ethylene bromhydrine, may also be used. Moreover, instead of diethylamine, also other secondary amines may be condensed with isobutyl-benzyl-chloroethyl ether, such as for example methyl ethyl amine, methyl propyl amine, diallyl amine, morpholine, pipecoline.

Example 3

A mixture of 20 parts of n-propylbenzyl-(diethyl-aminoethyl)-ether and 10.4 parts of benzyl chloride is heated to 110° C. in 100 parts of chlorobenzene for 12 hours. The quaternary base is completely precipitated by means of petroleum ether and is a viscous, clearly water-soluble oil.

By means of ethyl iodide a quaternary base is obtained in a similar manner, this base constituting a crystallised water-soluble product.

Example 4

To the sodium salt from 4 parts of sodium amide and 15 parts of n-propyphenyl-carbonal in 100 parts of absolute benzene, there are added about 15 parts of raw β-chloroethyl piperidine and the whole is stirred at 80° C. during 12 hours. After addition of water there is extracted with diluted hydrochloric acid, then the hydrochloric acid extracts are made alkaline by means of potassium carbonate and the free base thus separated is taken up in ether. Its boiling point at 0.4 mm. pressure is 128°–130° C.

Example 5

By mixing 4 parts of sodium amide and 16.4 parts of isobutylphenyl-carbinol in 100 parts of absolute benzene, the sodium salt of the carbinol is produced; then 14.9 parts of γ-chloropropyl-diethylamine are added thereto and the whole is heated to 100° C. for 8 hours, while stirring. After addition of water the mixture is extracted several times by means of diluted hydrochloric acid and the combined extracts are made alkaline under cooling by means of concentrated caustic soda lye and etherified. The boiling point of the ether residue at 12 mm. pressure is 166°–167° C.

Instead of isobutyl-phenyl-carbinol one may also use secondary butyl-phenyl-carbinol.

Example 6

5 parts of sodium are powdered in xylol and, after cooling, 35 parts of benzhydrol are introduced therein by portions. While developing hydrogen and self-heating all becomes dissolved. Finally the whole is still heated to boiling for 10 minutes. After cooling 25 parts of β-chloroethyl diethyl amine are added and the mixture is stirred over night at 90°–100° C. On the next morning the cooled reaction mixture is diluted with ether, then first washed with water and extracted with 2-n-hydrochloric acid. The hydrochloric solution is made alkaline to phenol phthaleine, then again shaken with ether, the ether washed with water, dried with potassium carbonate and the ether distilled. The residue is distilled in high vacuo; boiling point at 0.15 mm. pressure =140°–142° C.

By neutralizing with hydrochloric acid and evaporating in vacuo the hydrochloride is obtained. When recrystallised from alcohol and ethyl acetate beautiful glass-clear prisms having the melting point of 140° C. are obtained.

The corresponding cyclohexyl-phenyl ether boils at a pressure of 0.6 mm. at 130°–132° C.

The cyclopentyl-phenyl ether boiling at 130°–133° C. at 1.6 mm. pressure and the cyclo- heptyl-phenyl ether boiling at 151°–156° C. at 1.5 mm. are obtained in the analogous manner.

Example 7

To 2 parts of powdered sodium amide in 100 parts of absolute benzene are added dropwise 6.2 parts of isobutyl-o-methyl-phenyl-carbinol, B. P. 12 mm. 120°–125° C., M. P. 68°–69° C. (made from o-toluylaldehyde and isobutyl bromide according to Grignard), whereupon the whole is heated for 1 hour at 60° C. Then 8 parts of β-chloroethyl diethyl amine are added dropwise thereto and, while stirring, the mixture is heated under reflux for 7 hours. After cooling the reaction mixture is extracted several times with diluted hydrochloric acid, then the combined acid extracts are made alkaline in the cold and extracted with ether. The ethereal residue boils in vacuo at 12 mm. pressure at 158°–161° C.

Instead of isobutyl-o-methyl-phenyl-carbinol, secondary butyl-o-methyl-phenyl-carbinol can also be used.

The boiling points of similar compounds according to the formula

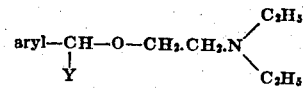

are given in the following table:

| Aryl radical | Y | Boiling point at mm. pressure | |
|---|---|---|---|
| 3,5-di-CH₃-phenyl | —CH₂.CH₂.CH₃ | 165–170 °C | 12 |
| 3,5-di-CH₃-phenyl | —CH₂.CH₂.CH₂.CH₃ | 123–126 | 0.7 |
| Cl-phenyl | —CH₂.CH₂.CH₃ | 167–171 | 12 |
| naphthyl | —CH₂.CH₂.CH₃ | 138–144 | 0.02 |
| o-OCH₃-phenyl | cyclopentyl (—CH₂—CH₂—CH₂—CH₂—CH₂—) | 161–163 | 0.9 |
| phenoxyphenyl | —CH₂.CH₂.CH₃ | 160–162 | 0.08 |
| CH₃-phenyl | C₆H₅ | 144–146 | 0.1 |
| 3,5-di-CH₃-phenyl | C₆H₅ | 153–155 | 0.08 |

Example 8

To the sodium salt from 4 parts of sodium amide and n-propyl-(phenylethenyl)-carbinol (prepared from n-propyl-magnesium bromide and cinnamic aldehyde) in 100 parts of absolute benzene are added 14 parts of β-chloroethyl-diethylamine and the mixture is heated under reflux during 6 hours. After the usual working up 15 parts of the final product boiling at 0.07 mm. pressure at 119°–121° C. are obtained.

By hydrogenation with platinum and Raneynickel as catalysts at ordinary pressure and temperature the corresponding n-propyl-(phenylethyl)-carbine ether is obtained. Boiling point at 0.15 mm. pressure=113°–115° C. which is also obtainable from dihydro cinnamic aldehyde.

Example 9

By interaction of 2 parts of powdered sodium amide and 9 parts of n-propyl-(phenoxymethyl)-carbinol in 100 parts of absolute ether the sodium salt of the carbinol is first produced, whereupon the same is caused to react with 7 parts of β-chloroethyl diethylamine by heating under reflux during 6 hours. After a usual working up the base is obtained in a yield of 6 parts; B. P. 12 mm. 175°–177° C.

Example 10

16.4 parts of n-propylbenzyl-carbinol dissolved in 100 parts by volume of absolute benzene are added dropwise at room temperature and while stirring to a suspension of 4 parts of sodium amide in 100 parts by volume of absolute benzene and then maintained for 1 hour at 60° C. After cooling 15 parts of diethylaminoethyl chloride are added and stirred under reflux over night at 90°–100° C. After recooling the solution is treated with diluted hydrochloric acid until a distinctly mineral acid reaction is reached, whereupon the benzene layer is separated. The base is freed from the aqueous layer by means of alkali, then taken up in ether and, after drying of the ethereal solution and distillation of the ether, distilled at 155°–159° C. and at 12 mm. pressure.

In an analogous manner the phenyl-benzylcarbinyl-diethylaminoethyl ether boiling at 171°–173° C. and 1.9 mm. pressure is obtained.

Example 11

As stated in Example 10, 4 parts of sodium amide and 20.4 parts of cyclohexylmethyl-phenylcarbinol in 200 parts by volume of absolute benzene are caused to react together, then treated with 15 parts of diethylamino ethyl chloride and heated for 10 hours at 90°–100° C. After the usual working up the new amino ether is obtained in form of an oil having the boiling point of 152°–155° C. at 0.1 mm. pressure. It is easily soluble in acids.

According to the usual methols fully illustrated in the above examples, a plurality of different amino ethers may be produced by varying the components. As further examples may be enumerated: styrylbenzyl- or chlorobenzyl-carbinyl-diethylaminoethyl ether, o- and p-tolyl-benzyl-carbinyl-diethylamino- or -dimethylaminoethyl ether, cyclohexyl- or cyclopentyl-benzyl-carbinyl-diethyl- or -dimethylaminoethyl ether and so on.

What we claim is:

1. An amino-ether of the formula

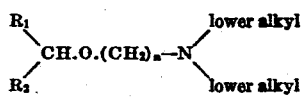

wherein $R_1$ represents a member selected from the group consisting of alkyl radicals with at most 5 carbon atoms, and of cycloalkyl radicals with 5 to 7 carbon atoms, $R_2$ represents a member selected from the group consisting of the phenyl, chlorophenyl, methylphenyl, dimethylphenyl, methoxyphenyl, phenoxyphenyl and naphthyl radicals, and $n$ is one of the integers 2 and 3.

2. A process for the manufacture of an amino-ether, which comprises condensing a reactive halide of the formula

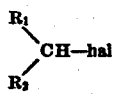

wherein $R_1$ represents a member selected from the group consisting of alkyl radicals with at most 5 carbon atoms, and of cycloalkyl radicals with 5 to 7 carbon atoms, and $R_2$ represents a member selected from the group consisting of the phenyl, chlorophenyl, methylphenyl, dimethylphenyl, methoxyphenyl, phenoxyphenyl and naphthyl radicals, and hal represents a reactive halogen atom, with an alkylene halogen hydrine wherein the alkylene group contains from two to three carbon atoms, and then condensing the resulting halo-alkyl ether with a secondary amine.

3. An amino-ether of the following formula

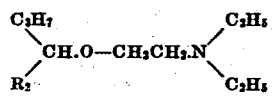

wherein $R_2$ represents a member selected from the group consisting of the phenyl, chlorophenyl, methylphenyl, dimethylphenyl, methoxyphenyl, phenoxyphenyl and naphthyl radicals.

4. An amino-ether of the formula

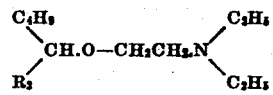

wherein $R_2$ represents a member selected from the group consisting of the phenyl, chlorophenyl, methylphenyl, dimethylphenyl, methoxyphenyl, phenoxyphenyl and naphthyl radicals.

5. An amino-ether of the formula

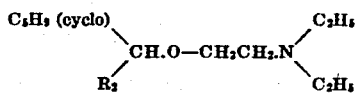

wherein $R_2$ represents a member selected from the group consisting of the phenyl, chlorophenyl, methylphenyl, dimethylphenyl, methoxyphenyl, phenoxyphenyl and naphthyl radicals.

6. A process for the manufacture of an amino-ether of the formula

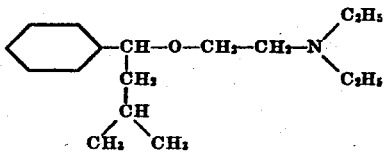

which comprises condensing α-isobutylbenzyl chloride with ethylene chlorhydrine, and then condensing the resulting α-isobutylbenzyl-(chloroethyl)-ether with diethyl amine.

7. The α - isobutyl - benzyl - diethylaminoethyl ether of the formula

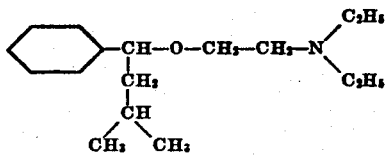

being a liquid having the boiling point of 143°–149° C. at 12 mm. pressure.

8. The α-cyclopentyl-benzyl-diethylaminoethyl ether of the formula
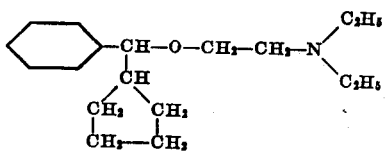
being a liquid of the boiling point of 130°–133° C. at 1.6 mm. pressure.
9. The α-propyl-3:4-dimethyl-benzyl-diethylaminoethyl ether of the formula
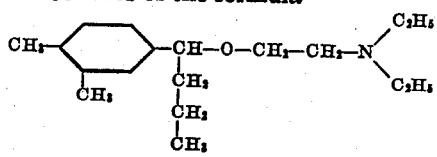
being a liquid of the boiling point of 165°–170° C. at 12 mm. pressure.
HENRY MARTIN.
FRANZ HÄFLIGER.
KARL GÄTZI.
ADOLF GROB.